UNITED STATES PATENT OFFICE.

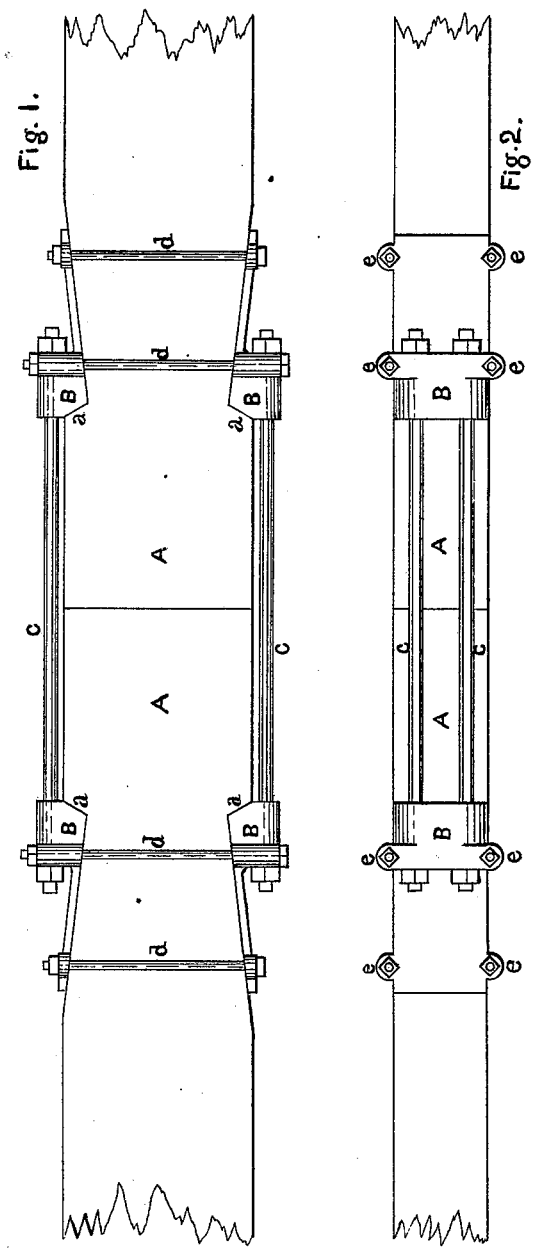

ALBERT W. HUBBARD AND LEWIS B. EDDY, OF CLEVELAND, OHIO.

IMPROVEMENT IN TIMBER-SPLICES FOR BRIDGES.

Specification forming part of Letters Patent No. 195,820, dated October 2, 1877; application filed March 6, 1877.

*To all whom it may concern:*

Be it known that we, ALBERT W. HUBBARD and LEWIS B. EDDY, both of the city of Cleveland, in the county of Cuyahoga and State of Ohio, have invented a new and useful Improvement for Splicing Timbers; and we do hereby declare that the following is a full, clear, and exact description thereof, which will enable others skilled in the art to which it pertains to make and use the same, reference being had to the accompanying drawings, forming a part of this specification, in which—

Figure 1 represents a side view or elevation of our device when fully adjusted to operate as a timber-splice, and Fig. 2 is a top or plan view of the device when so adjusted.

In the various wooden structures which require the employment of timbers of extraordinary lengths an efficient, durable, and inexpensive splice has long been a desideratum. This is especially the case in the construction of long tension-chords in wooden bridges. The splices and unions heretofore in use have been found deficient in holding-power; and this deficiency has generally resulted from an insufficient bearing-surface between the splicing device and the timbers at the points where the two come in contact, whereby the fiber of the timber at these points is soon crushed, and the timber drops out of line, and endangers the stability of the structure of which it forms a part.

Our invention is ascertained by experiment to embrace a substantial remedy for the defects referred to.

A A are the adjacent ends of two pieces of timber brought into line for the purpose of being spliced. B B B B are clamp-heads, united in the manner hereinafter described. C C C C are bolts used to connect the clamp-heads longitudinally, or in the direction of the length of the timber; and $d\ d\ d\ d$ are bolts used to connect the clamp-heads vertically, or at right angles to the bolts C C C C, when in place. The clamp-heads are bored longitudinally to receive the bolts C C C C, and vertically through the lugs $e\ e\ e\ e$ to receive the cross-bolts.

The clamp-heads may be made of cast-iron, the bolts of wrought-iron, and both should be of superior quality.

We make in the timbers to be spliced, and near the splice ends, but far enough therefrom to leave a strong clutch for the clamp-heads, the recesses shown in the drawings at $a\ a\ a\ a$, each recess having a beveled shoulder. Against these shoulders we place the clamp-heads, which are united by means of the longitudinal bolts C C C C and the cross-bolts $d\ d\ d\ d$, as shown in the drawings. These bolts are furnished with end nuts and screws, by means of which, as is manifest, any degree of compression within the strength of the parts may be applied to the clamp-heads, when arranged as shown in the drawing, for the purpose of holding the united timbers in a firm and substantial splice.

Having thus described our invention, what we claim as new, and desire to secure by Letters Patent, is—

The clamp-heads B B B B, beveled shoulders $a\ a\ a\ a$ on the timbers, and the bolts C C C C and $d\ d\ d\ d$, when constructed and arranged substantially as and for the purposes described.

Witness our hands at Cleveland, Ohio, this 22d day of February, 1877.

A. W. HUBBARD.
      L. B. EDDY.

Witnesses:
 JOHN COON,
 C. L. MOREHOUSE.